Nov. 11, 1969  D. T. ABBOTT ET AL  3,477,794
YIELDING BUSHING
Filed Feb. 14, 1967
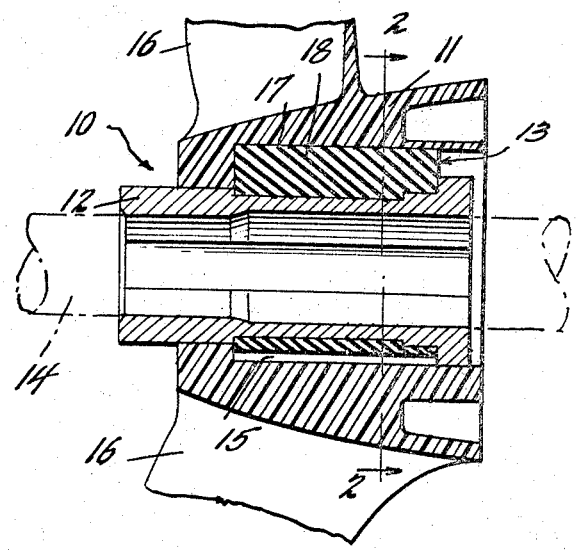
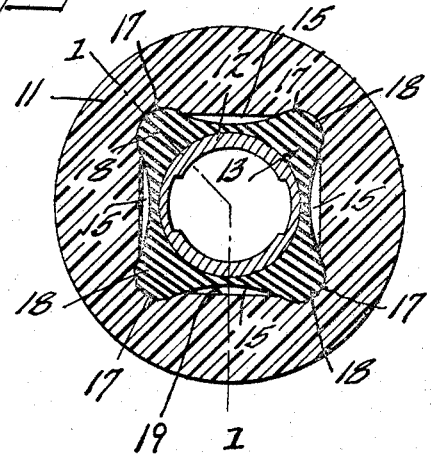
INVENTORS
D. T. Abbott
W. C. Thompson United States Patent Office 3,477,794
Patented Nov. 11, 1969

3,477,794
YIELDING BUSHING
Douglas T. Abbott, Garden City, and William C. Thompson, Freeport, N.C., assignors to Columbian Bronze Corporation, Freeport, N.Y., a corporation of New York
Filed Feb. 14, 1967, Ser. No. 615,960
Int. Cl. B63h 1/20; F16d 3/14
U.S. Cl. 416—134    6 Claims

ABSTRACT OF THE DISCLOSURE

A yieldable bushing located between a drive shaft and a propeller hub surrounding the drive shaft and translating motion from the drive shaft to the hub. The bushing has arms that extend into the hub and spaces are provided between the arms so that sudden impacts on the propeller will result in momentary movement of the hub relative to the drive shaft until the spaces between the bushing arms have been filled.

---

The present invention relates generally to yieldable bushings or inserts for a power drive system embodying a driving means and a driven member. More particularly, the invention relates to a yieldable bushing for a power drive system in which a drive shaft operates to impart motion to the driven member, and a bushing is mounted in engaging relation with the drive shaft and the driven member and is adapted to translate motion from the drive shaft to the driven member. The power drive system has been found especially useful in the drive train of motor-powered boats.

During the operation of conventional water craft that are adapted to obtain relatively high speeds, the propellers thereof often emerge from the water for a few seconds, permitting the engine to speed up and resulting in very high propeller speeds. The propellers then become reimmersed in the water, resulting in an extremely high impact or shock to the propeller blades. Quite often, the extremely high torque imparted to the propeller blades after having emerged from the water results in propeller blade break or failure upon reentry into the water. Break also occasionally occurs when the propeller first emerges from the water due to the increased torque resulting from the rapid speed-up of the engine. Also, break or failure can result from the propeller blades striking a submerged object.

Another problem which commonly arises in gear train systems utilized to drive boat propellers and other propellers is that of strain to which the gear train is subjected at the time of shifting gears, particularly in engine reversing gear systems where a sudden impact is imposed on the gearing during the shifting of gears from a forward to a reverse directional drive. The torque imposed on the gear train during such shifting generally is far in excess of that normally imposed on the system during conventional operation thereof, and thus imposes a strain on the system.

In conventional water craft propeller systems, it is common practice to provide a rubber bushing, designed to slip onto and be firmly held on the drive shaft and stationary with respect to the propeller hub. Normally, the rubber at these conventional bushings is quite stiff, as its primary function is to slip if the torque exceeds a given amount. Therefore, conventional rubber bushings provide little if any protection against damage to the propeller blades due to sudden impact resulting from high torque after reentry into the water.

The problem of propeller break is accentuated where the propeller blades and hub are constructed from synthetic plastics. It is desirable to construct propellers from synthetic plastics due to their lightness in weight, thereby resulting in greater efficiency. Also, plastics are more economical and less expensive to mold and die-cast than metals. Still further, plastics are not subject to corrosion in salt water as are the heavier metals and alloys, and so they may be expected to have a longer working life in the absence of accident damage. Accordingly, it would be highly desirable to provide plastic propellers and a driving system which would combine the advantages of the synthetic plastics with the strength and resistance to shock on impact of metals. However, plastics are generally more brittle and subject to impact damage than conventional metallic propellers.

It is, therefore, a primary objection of the present invention to provide a yieldable bushing for a propeller drive system which will lessen the sudden impact to the system on temporary, radical increases or decreases in torque, for example, on reversing the directional drive of the gear system, by spreading the change in torque over a relatively short time interval.

It is an important object of the present invention to provide a yieldable bushing for propeller drive system resistant to the shock and impact resulting from the emergence and reentry of the propeller into the water after the torque of the propeller has been greatly increased.

According to our invention, the aforesaid shock and impact is substantially lessened or avoided by providing a yieldable bushing on the drive shaft or driving means designed to firmly engage the propeller hub or driven means, under normal operating conditions, but to yield slightly when rapid changes of torque occur. In general, our invention is a yieldable bushing having surfaces cooperating with both the driving and driven means. One of the bushing surfaces is formed with spaced, protruding torque arms capable of being distorted through a degree of torque with respect to the driving or driven means. Distortion of the torque arms results in less abrupt and more even transmission of changes in torque from the driving to the driven means.

It will be understood that the yieldable bushing of the present invention is adapted for use in any power system, particularly one in which the driven means is subjected to rapidly differing conditions of torque. Thus, the bushing of the present invention is especially suitable for use in such systems as earth moving or other solid material moving means wherein a driving means is under a constant driving force and imparts movement to a driven means which encounters varying degrees of resistance.

Due to its relatively low cost and ease of workability, it is preferred to employ rubber as material used to form the yieldable bushing. However, any yieldable material may be substituted therefor. Thus, for example, many synthetic resins that are capable of being molded or shaped and are resilient can be used.

These and other objects, features and advantages of the present invention will become more apparent when taken in connection with the illustration of a preferred embodiment of our invention in the accompanying drawing, which forms a part hereof, and in which:

FIG. 1 is a side elevational view, partly broken away, of an embodiment of my propeller and drive shaft, and FIG. 2 is a sectional view along the line 2—2 of FIG. 1.

Referring now to the drawing, a propeller drive system, generally referred to by the numeral 10, is shown. The system consists of hub 11, provided with propeller blades 16, (shown broken away) formed integral therewith. Both the hub and blades are made of plastic material. Housed within a longitudinally extending passageway in hub 11 is a drive shaft 14 which is surrounded by metallic collar 12, fixed to it. Surrounding collar 12 is a yieldable bushing 13 which is fixed with respect to the collar. Hub 11 is provided with four interior slots, recesses or keys 17 within which the torque arms 18 of bushing 13 are adapted to fit. The shape of bushing 13 is designed to allow for spaces 15 between adjacent torque arms 18 of the bushing 13, and the hub 11. At these spaces the passageway in the hub is free of the resilient material from which the bushing 13 is formed.

The particular shape of the yieldable bushing 13 is not critical. It is only necessary that it be shaped to provide spaced locations that are in non-slip engagement with the hub 11, and that there be spaces free of bushing material between the spaced, non-slip locations of the bushing, itself.

The view of the drive system shown in FIG. 2 is taken along the line 2—2 of FIG. 1 and shows more clearly the manner in which the yieldable bushing 13 engages the hub 11. As will be seen with reference to FIG. 2, the protruding torque arms 18 or lobes of the yieldable bushing 13 are adapted to fit snugly into the sockets or recesses of hub 11, there being provided the passageway spaces 15 between bushing 13 and hub 11 between the lobes of the bushing. The interior surface of the passageway is made up of a plurality of substantially planar surfaces 19 connected to one another by the substantially smoothly curved recesses 17.

The bushing of the present invention is designed to operate in the following manner. Should the propeller be subjected to a sudden increase or decrease in torque due, for example, to a sudden speeding up of the drive shaft 14 or a sudden slowing or decrease in rotation of hub 11, the yieldable bushing 13 will distort at the torque arms 18 and the drive shaft 14 or hub 11 move through several degrees of rotation with respect to each other until the empty spaces 15 are filled with the yieldable material of which the bushing is made. After the filling of spaces 15, an equilibrium point is reached, at which time the yieldable bushing will return substantially to its original shape. Thus, it will be seen that rapid changes in rotation or torque are compensated for through the gradual slowing down or speeding up, as the case may be, of the hub 11. The degree and ease of rotation of the driving and driven means relative to each other can be changed depending on the particular characteristics of the material of which the bushing is composed or by increasing the number or size of spaces 15 or torque arms 18.

The bushing 13 may take a variety of shapes and the design of the sockets in hub 11 may take a variety of forms. It is only necessary that there be loci in the hub 11 designed to engage the yieldable bushing 13 at certain points and that there be provided empty spaces between other portions of the bushing 13 and the hub 11.

In another form, the yieldable bushing 13 may be firmly affixed to hub 11 with no empty spaces provided therebetween and sockets or slots provided in the collar 12 of the drive shaft 14 of a configuration to engage lobes or protrusions on the interior surface of bushing 13, and empty spaces provided between other portions of bushing 13 and metallic bushing 12. In this manner a similar torque resisting effect may be achieved, and sudden increases or decreases in the rotation of either the drive shaft 14 or the propeller hub 11 will be compensated by the distortion of yieldable bushing 13.

It will be apparent that certain modifications and alterations in the yieldable bushing illustrated and described hereinabove will be obvious to those skilled in this art and made without departing from the scope of the present invention. All such obvious modifications and alterations are deemed to fall within the purview of the invention, which is to be limited only by the scope of the following, appending claims.

We claim:
1. A resilient rotary drive coupling comprising:
    (a) a driving means,
    (b) a driven means, and
    (c) a yieldable bushing comprising a substantially ring shaped body of flexible material having a first surface firmly attached to a surface of one of said means, and a second surface formed with spaced protruding torque arms capable of being distorted through a predetermined degree of torque with respect to said first surface, said second surface being in non-slip engagement with a surface of said other means, said surface of said other means comprising a plurality of substantially planar surfaces connected to one another by substantially smoothly curved recesses, said recesses cooperating with said torque arms to provide said non-slip engagement, the spaces between said torque arms defined by said second surface and said surface of said other means being unoccupied,
    said driving means, driven means and bushing cooperating such that distortion of said torque arms and said bushing causes said unoccupied spaces to be filled with said flexible material of said bushing.

2. A coupling as in claim 1 wherein said first surface comprises the inner periphery of said ring shaped body and said second surface comprises the outer periphery of said ring shaped body.

3. A coupling as in claim 1 wherein said flexible material is rubber.

4. A coupling as in claim 1 wherein said flexible material is a synthetic plastic.

5. A coupling as in claim 2 wherein said driving means comprises an elongated, substantially cylindrical shaft disposed within and firmly engaging said inner periphery of said bushing.

6. A coupling as in claim 5 wherein said driven means comprises a propeller having a hub and at least one blade fixed thereto and rotatable therewith, said hub having a substantially cylindrical hollow passageway extending therethrough in a direction transverse to said blade, said passageway having a surface comprising said planar surfaces and said recesses.

References Cited

UNITED STATES PATENTS

| | | | |
|---|---|---|---|
| 2,363,469 | 11/1944 | Goldschmidt. | |
| 2,469,116 | 5/1949 | Kiekhaefer | 170—160.54 |
| 2,564,826 | 8/1951 | Yoder. | |
| 3,012,767 | 12/1961 | Jones. | |
| 2,235,605 | 3/1941 | Bugatti | 170—160.54 |
| 2,312,822 | 3/1943 | Julien et al. | 170—160.54 |
| 2,993,544 | 7/1961 | Carlson | 170—160.54 |
| 3,047,074 | 7/1962 | Rielag | 170—160.54 |

FOREIGN PATENTS

| | | |
|---|---|---|
| 850,099 | 9/1952 | Germany. |
| 661,643 | 11/1951 | Great Britain. |
| 801,998 | 9/1958 | Great Britain. |

EVERETTE A. POWELL, JR., Primary Examiner

U.S. Cl. X.R.

64—27

PO-1050
(5/69)

UNITED STATES PATENT OFFICE
CERTIFICATE OF CORRECTION

Patent No. 3,477,794      Dated Nov. 11, 1969

Inventor(s) D. T. Abbott and W. C. Thompson

It is certified that error appears in the above-identified patent and that said Letters Patent are hereby corrected as shown below:

In the heading, line 2, "Freeport, N. C." should read "Freeport, N. Y."

SIGNED AND
SEALED
JUN 2 1970

(SEAL)
Attest:

Edward M. Fletcher, Jr.
Attesting Officer

WILLIAM E. SCHUYLER, JR.
Commissioner of Patents